United States Patent [19]
Dai et al.

[11] Patent Number: 5,549,813
[45] Date of Patent: *Aug. 27, 1996

[54] FCC PROCESS EMPLOYING LOW UNIT CELL SIZE Y-ZEOLITES

[76] Inventors: Pei-Shing E. Dai; Chih-Hao M. Tsang; Laurence D. Neff; Randall H. Petty, all of P.O. Box 1608, Port Arthur, Tex. 77641

[*] Notice: The term of this patent shall not extend beyond the expiration date of Pat. No. 5,354,452.

[21] Appl. No.: 206,801

[22] Filed: Mar. 7, 1994

[51] Int. Cl.⁶ .................................................. C01G 45/12
[52] U.S. Cl. ........................................ 208/120; 208/111
[58] Field of Search .................................... 208/120, 111

[56] References Cited

U.S. PATENT DOCUMENTS

| | | | |
|---|---|---|---|
| 3,449,070 | 6/1969 | McDaniel | 23/111 |
| 3,506,400 | 4/1970 | Eberly, Jr. et al. | 23/182 |
| 4,604,373 | 8/1986 | Clark | 502/79 |
| 4,663,025 | 5/1987 | Fu | 208/120 |
| 4,840,930 | 6/1989 | LaPierre | 502/79 |
| 4,894,142 | 1/1990 | Steigler | 208/111 |
| 5,013,700 | 5/1991 | Falth | 502/64 |
| 5,059,567 | 10/1991 | Linsten | 502/64 |
| 5,308,472 | 5/1994 | Dai et al. | 208/111 |
| 5,354,452 | 10/1994 | Dai et al. | 208/120 |

*Primary Examiner*—Helane Myers

[57] ABSTRACT

Disclosed is a fluid catalytic cracking process for cracking gas oils and naphtha which provides improved selectivity for $C_3$–$C_5$ olefins employing a catalyst comprising a novel zeolite characterized by a large number of secondary pores, a substantially decreased Lattice Constant of below about 24.19 Å, and a substantially decreased Acid Site Density, attained by hydrothermal and acid-treating of an ultrastable Y-zeolite.

3 Claims, 3 Drawing Sheets

FCC PROCESS EMPLOYING LOW UNIT CELL SIZE Y-ZEOLITES

RELATED APPLICATIONS

This application is related to U.S. Pat. No. 5,354,452, filed Oct. 19, 1992, which is a continuation-in-part of application Ser. No. 07/463,650, filed Jan. 11, 1990. This application is also related to Ser. No. 08/206,803.

FIELD OF THE INVENTION

This invention relates to a process for hydrocarbon processing using a modified zeolite. More particularly, this invention relates to a fluid catalytic cracking process for increasing yields of light olefins ($C_3$–$C_5$) using as catalysts ultralow unit cell size Y-zeolites.

BACKGROUND OF THE INVENTION

As is well known to those skilled in the art, zeolite catalysts have been used in hydrocarbon processing. Prior art zeolites have been found to be effective as catalysts for cracking, hydrocracking, hydroisomerization, etc. Recent trends in resid hydroprocessing demand increased conversion of feed having a boiling point above 1000° F. as well as improved hydrogenation selectivity as measured by Conradson carbon conversion and hydrodenitrogenation (HDN) of the 1000° F.-products attained from cracking of the residue.

It is also known in the art to use certain zeolites in a fluid catalytic cracking process. The FCC octane barrel catalyst (i.e. a catalyst which permits attainment of both octane number and gasoline yield) typically contains ultrastable Y-zeolites or dealuminated Y-zeolites. The ultrastable Y-zeolite is generally obtained by hydrothermal or thermal treatment of the ammonium or hydrogen form of the Y-type zeolite at temperatures above 1000° F. in the presence of steam. Ultrastabilization by hydrothermal treatment was first described by Maher and McDaniel in the U.S. Pat. No. 3,374,056. U.S. Pat. No. 3,449,070 to McDaniel et al. discloses a method of producing an ultrastable Y-zeolite by base exchanging a charge faujasite zeolite to reduce the alkali metal content. The Unit Cell Size of the product is 24.40 Å–24.55 Å. Ammonium exchange and a second hydrothermal treatment at a temperature of about 1300° F. to 1900° F. further reduces the Unit Cell Size down to 24.20 Å to 24.45 Å. Hydrothermal treatment removes tetrahedral aluminum from the framework but not from the zeolite cages or channels where it remains as a hydrated cation or an amorphous oxide.

The Silica to Alumina Ratio of fluid catalyst cracking (FCC) catalyst usually refers to the $SiO_2/Al_2O_3$ mole ratio of the zeolite component. It differs from the atomic Si/Al ratio by a factor of two. Framework silica/alumina and total silica/alumina mole ratios of the zeolite should also be distinguished. Only aluminum (or alumina) that is part of the zeolite crystal structure (the framework) is included in the former. Total or bulk silica/alumina mole ratio also includes the alumina or amorphous oxide debris left in the void spaces of the zeolite after dealumination.

A variety of methods of dealumination are known in the art. A reference which provides an informative overview of the various processes is *CATALYTIC MATERIALS:RELATIONSHIP BETWEEN STRUCTURE AND REACTIVITY*, Ed. White, T. E., et al., Chapter 10, American Chemical Society, Washington, D.C., 1984. Using a chelating agent such as EDTA, up to about 50% of aluminum can be removed from the zeolite in the form of a water soluble chelate, without any appreciable loss in zeolite crystallinity and about 80% of aluminum atoms can be removed from the zeolite in the form of a water soluble chelate while the zeolite maintains 60%–70% of its crystallinity. U.S. Pat. No. 4,503,023 teaches the procedure for treating zeolites with ammonium hexafluorosilicate. In this method, an aqueous solution of $Na_2SiF_6$ is used to replace some aluminum atoms with silicon atoms in the zeolites. Silicon may replace up to 60% of the aluminum without crystal damage. Debris formation and structure defect are negligible in this process. Unit Cell Sizes range from 24.35 Å to 24.60 Å.

In general, as the zeolite framework is dealuminated, the Unit Cell Size ($A_0$) decreases. The number of aluminum atoms per unit cell ($N_{Al}$) can be estimated from the Unit Cell Size according to the Breck-Flanigan relationship:

$$A_o \text{ (in Å)} = 24.191 + 0.00868 \, (N_{Al}) \qquad [1]$$

Because the total number of aluminum and silicon atoms ($N_{Al}+N_{Si}$) is constant, according to:

$$N_{Al}+N_{Si}=192 \qquad [2]$$

then, the framework Silica to Alumina mole ratio can be expressed as:

$$SiO_2/Al_2O_3=2\,[(1.6704/UCS-24.19)-1)] \qquad [3]$$

where UCS is the Unit Cell Size in Angstroms equivalent to $A_0$ (in Angstroms) of Equation 1.

X-ray diffraction Unit Cell Size measurements can therefore be used to estimate the framework Silica to Alumina Mole Ratios. The Unit Cell Size of the zeolite may also predict zeolite properties such as hydrothermal stability, total acidity, and acid strength.

The catalytic activity in a fluid catalyst cracking process and the octane number of the product gasoline also correlate with the Unit Cell Size of the zeolite catalyst component. Ritter et al. reported in NPRA Annual Meeting, Los Angeles; Mar. 23, 1986; paper AM-86-45, that in FCC pilot plant experiments, the Unit Cell Size correlated well with both the research octane number and motor octane number of product gasoline fractions. They reported that about 15% of the total octane gain is observed as the Unit Cell Size decreased from 24.45 Å to 24.35 Å, and an additional 35% of the octane gain occurred as the Unit Cell Size decreased from 24.34 Å to 24.28 Å.

As is well known to those skilled in the art, FCC gasoline octane barrels can be improved if the Unit Cell Size equilibrates to approximately 24.30 Å. Reducing the Unit Cell Size below 24.30 Å increases gas yield but does not significantly improve octane. There is a continuing search for a narrow band of Unit Cell Sizes that will yield maximum octane barrels. In most of the prior art methods of dealuminating catalysts for cracking and hydrocracking processes, the Unit Cell Size is controlled to be in the range of 24.30 Å–24.45 Å in an attempt to achieve maximum activity for vacuum gas oil conversion in FCC operations.

Mass transfer within cracking and hydrocracking catalysts for heavy oil upgrading has a significant effect on gasoline and light gas oil selectivities. The cracking sites on or near the zeolite crystal exterior primarily crack feed molecules such as gas oils, vacuum gas oils and residua. The cracking sites in the zeolite crystal interior primarily crack smaller product molecules like gasoline. Improving access to the zeolite interior reduces gasoline recracking and enhances gasoline production. The most straightforward way to minimize diffusional limitation is to increase the secondary porosity of the zeolites and by reducing the zeolite crystal size via dealumination.

U.S. Pat. No. 3,506,400 to Eberly, Jr., et al., discloses treating a conventional faujasite having a silica/alumina mole ratio of 8–12 in the ammonia form with steam at 800° F.–1500° F. followed by acid treatment at temperatures and times effective to remove amorphous alumina. This reference discloses product zeolites with unit cell sizes greater than or equal to 24.28 Angstroms with alumina present and about 24.2 Angstroms for an alumina free crystalline polysilicate. This reference fails to disclose any product zeolite having a Unit Cell Size less than 24.19 Å. This reference also does not teach how to increase the secondary pore volume of the zeolites in order to augment the cracking activity of heavy oils.

U.S. Pat. No. 4,840,930 to LaPierre et al. discloses treating a charge Y-zeolite to make it stable to acid. The charge is characterized by a silica/alumina ratio of 3–25. The charge is contacted with a steam-containing atmosphere at increasing temperatures in the 392° F.–1202° F. range. Specifically the critical rates of heating are (i)>2° and <4° C./min at 392° F.–932° F., and (ii) 0.2°–0.5° C./min at 932° F.–1202° F. These ranges are critical; and operating outside these ranges yields undesirable results. This reference does not teach a method of producing zeolite having a Unit Cell Size of 24.19 Å or less or having an increased secondary porosity.

U.S. Pat. No. 4,512,961 discloses a process of producing a dealuminated Y-zeolite by a combination of hydrothermal treatment at a temperature from 932° F. to 1652° F. for a period of 1–5 hours and ion-exchange resin removal of aluminum from the crystalline structure of the zeolites at 212° F. for a time about 1–4 hours. This patent does not reveal any product zeolite having a Unit Cell Size of 24.19 Å or less.

U.S. Pat. No. 5,059,567 to Linsten et al., discloses a process for the preparation of a modified Y-zeolite having a unit cell size of 24.15–24.59 Å. The product zeolite is produced by subjecting charge zeolite NaY to a series of treatment steps comprising ammonium ion exchange and calcination. If the unit cell size is to be reduced to 24.15–24.35 Å, an aluminum ion-exchange is carried out, followed by calcination in steam at 500°–900° C. The decrease in the unit cell size depends on the amount of aluminum supplied by ion-exchange. U.S. Pat. No. 5,242,677 to Cooper et al., discloses a method of preparing stable Y-zeolite with unit cell sizes of 24.09–24.14 Å by the steps of aluminum ion-exchange, steam calcination, and acid treatment. The instant invention can be distinguished from these two references in that no aluminum ion-exchange step is required to produce a dealuminated Y-zeolite having unit cell sizes of 24.02–24.18 Å.

U.S. Pat. No. 5,243,121 to Madon et al., discloses a FCC catalyst comprising a non-zeolitic component of at least 45% $Al_2O_3$ and containing no more than 30% Y-zeolite with unit cell sizes less than 24.29 Å. As shown in Example 1 of the Madon, et al. patent, the hydrothermally treated Y-zeolites having unit cell sizes of 24.26 and 24.27 Å gave greater yields of isobutylene than the zeolite having the unit cell size of 24.29 Å and a steamed commercial Y-zeolite having the unit cell size of 24.23 Å.

We have now found that a dealuminated Y-zeolite having a Unit Cell Size smaller than about 24.19 Å and increased secondary porosity can be reproducibly made by using the process of the instant invention. The resulting product zeolite is also characterized by presence of a significant quantity of non-zeolite components, i.e., amorphous silica-alumina oligomers. The product zeolite is useful in the conversion of heavy oils containing vacuum resids to lighter products, particularly light gas oil. The product zeolite is also useful in the FCC process for increased $C_3$–$C_5$ olefin yields and reduced slurry oil yields as well as reduced coke-make. The product zeolite can be used as a catalyst for the conversion of propylene to isobutylene and isoamylene as well as for the conversion of paraffins to aromatics in the reforming process.

It is an object of this invention to provide an improved FCC process employing a zeolite having a lower unit cell size than previously possible. It is an object of this invention to provide a FCC process for increasing the yields of light olefins ($C_3$–$C_5$) using a Y-zeolite treated by the novel process of copending Ser. No. 07/962,549 and (Ser. No. 08/206,803), said zeolite characterized by having a unit cell size below 24.19 Å and as low as 24.02 Å. Other objects will be apparent to those skilled in the art.

STATEMENT OF THE INVENTION

In accordance with certain of its aspects, this invention is directed to an improved FCC process for catalytically cracking hydrocarbon feedstock selected from the group consisting of gas oils, naphthas and C6 to C40 paraffins to provide increased selectivity to $C_3$–$C_5$ olefins comprising the steps of:

a) maintaining in the reactor a zeolite catalyst characterized by:
 (i) a framework silica to alumina ratio of about 60–80,
 (ii) an increased Secondary Pore Volume of about 0.11–0.14 cc/g,
 (iii) a decrease lattice constant of about 24.02–24.18 Å,
 (iv) a surface Si to Al ratio of about 26–36 and,
 (v) an acid site density of about 1–6 cc $NH_3$/g zeolite, b) heating said catalyst, c) introducing the feedstock to the reactor, d) passing said feedstock over said catalyst, e) cracking catalytically and thermally the hydrocarbon feedstock with heat supplied by the hot catalyst solids to form a cracked product, f) separating the cracked product from the hot catalyst solids, and g) quenching the separated cracked product, for a total kinetic residence time (step c to e) of from 0.1 to 15 sec., at a temperature from 840° F. to 1200° F. and a pressure of 0 to 150 psig.

DETAILED DESCRIPTION

The catalyst of the instant invention and its preparation are described in U.S. Pat. No. 5,354,452 and Ser. No 08/206,803, incorporated herein by reference in their entirety.

The zeolites of these inventions are characterized by certain physical parameters, including a unit cell size significantly lower than previously possible.

It has been discovered these zeolites, when employed as charge zeolites in an FCC process reactor provide improved yields of desirable $C_3$–$C_5$ olefins.

FCC UNIT

Figure 4:
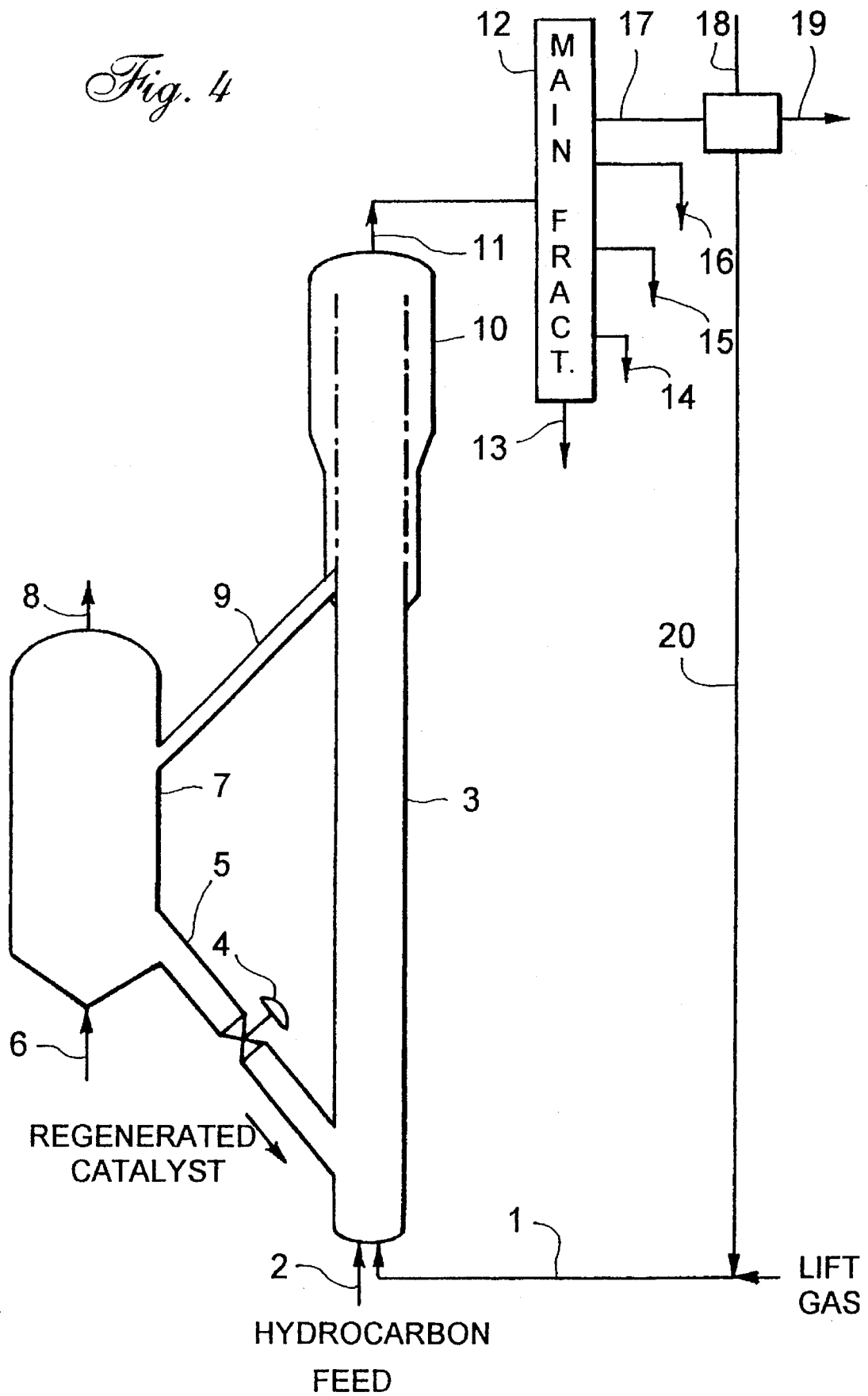
FIG. 4 is a schematic diagram of a conventional FCC reactor and regenerator.

A typical FCC reactor is shown in FIG. 4. Feed is charged to the riser reactor 3 via inlet 2. Hot regenerated catalyst is added via conduit 5, equipped with a flow control valve 4. A lift gas is introduced near the liquid and solid feed inlets via conduit 1. The riser reactor is an elongated, cylindrical smooth-walled tube.

The feed vaporizes and forms a dilute phase suspension with the FCC catalyst and passes up the riser, which generally increases in width to allow for volumetric expansion. Cracked products and coked catalyst may pass into a solid-vapor separation means, such as a conventional cyclone. The riser may have a deflector and a short residence time stripper, as disclosed in U.S. Pat. No. 4,629,552.

A closed cyclone design is disclosed in U.S. Pat. No. 4,749,471. At the base of vessel 10 there is usually provided a means for stripping entrained hydrocarbons from the catalyst. This is not included in FIG. 4, however such equipment is conventional. Cracked products are withdrawn from the reactor by conduit 11.

Stripped catalyst containing coke is withdrawn via conduit 9 and charged to a regenerator 7. The catalyst is regenerated by contact with an oxygen-containing gas, usually with air added via line 6. Flue gas is withdrawn from the regenerator by line 8.

Generally the feed temperature is about 300° F. to 700° F. The regenerator operates at about 1200° F. to 1400° F. and the catalyst to feed weight ratio is usually about 3:1 to 10:1, adjusted as necessary to hold a reactor outlet of about 840° F. to 1025° F.

The cracked product from the FCC unit passes via line 11 to the main fractionator 12, where the product is separated into a heavy slurry oil stream 13, heavy distillate 14, light distillate 15, naphtha 16 and a light overhead stream 17, rich in $C_2$–$C_4$ olefins, $C_1$–$C_4$ saturates and other light cracked gas components. This light stream is usually treated in an unsaturated gas plant 18, to recover various light gas streams, including $C_3$–$C_4$ LPG, and, optionally, $C_2$-fuel gas and related compounds. Preferably a light, $H_2$ rich gas stream is recycled from the gas plant via line 20, for use as all, or part of a lift gas used to contact catalyst in the base of the riser 3.

The instant process and catalyst would work well in the conventional FCC units just described as well as TCC units.

FEED

The feeds used in most FCC and TCC units includes gas oil or vacuum oil, naphthas or C6 to C40 paraffins having an initial boiling point above 400°–500° F., and an end boiling point above 750°–850° F.

The process will work when the feed includes a non-distillable fraction, e.g., 1000° F.+ boiling range material.

The feedstock which is employed in the examples to demonstrate the enhanced $C_3$–$C_5$ olefin yield is a high nitrogen-containing vacuum gas oil having the properties listed in Table IV.

Y-zeolites which are dealuminized to make the ultralow unit cell size catalysts of this invention are typically characterized by various properties including pore size, Unit Cell Size, framework Silicon to Aluminum Ratio, etc.

Primary Pore Size—The primary pores are small pores characterized by a pore diameter of less than about 100 Å, and typically 20 Å–40 Å, say 23 Å. These small or micropores are commonly present together with supermicropores having a pore diameter of 40 Å–100 Å, say 47 Å. Pore size is measured by nitrogen desorption isotherm.

Primary Pore Volume—The volume of the primary pores is typically 0.08–0.14, say 0.09 cc per gram of zeolite. Primary Pore Volume is measured by nitrogen desorption isotherm.

Unit Cell Size—the Unit Cell Size (or Lattice Constant) of the charge zeolites is typically 24.45 Å–24.60 Å, say 24.57 Å. Unit Cell Size is measured using a Scintag PAD-V X-ray diffractometer.

Secondary Pore Size—The secondary pores are large pores characterized by a pore size (diameter) of greater than 100 Å, and typically 100 Å–600 Å. Secondary Pore Size is measured by the nitrogen desorption isotherm.

Secondary Pore Volume—The charge zeolites which may be treated by the process of this invention are characterized by a low Secondary Pore Volume. Typical Secondary Pore Volumes are below about 0.05 cc/g and commonly in the range of 0.02–0.05 cc/g, say 0.02 cc/g. Thus the charge zeolites may be considered as being essentially free of secondary pores. Secondary Pore Volume is measured by the nitrogen desorption isotherm.

Secondary Pore Mode—There is no significant Secondary Pore Mode present in the charge zeolites because the pore volume of secondary pores having diameters of about 100 Å–600 Å typically is essentially zero.

Total Pore Volume—The Total Pore Volume of the charge zeolites which may be treated by the process of this invention may be 0.10–0.12 cc/g, say about 0.11 cc/g as measured by nitrogen desorption isotherm.

Total Surface Area—The Total Surface Area of the charge zeolites which may be treated by the process of this invention may be 600–700 m/g, say 683 m/g as measured by Brunauer-Emmett-Teller (BET) Technique.

Crystallinity—the crystallinity of the charge zeolites which may be treated by the process of this invention may be 85%–100%, say 100% as measured by X-ray diffraction.

Framework Silica to Alumina Ratio—The Silica to Alumina Ratio of the charge zeolites which may be treated by the process of this invention may be less than about 10, typically 5–10, say 6. This is equivalent to a Silicon to Aluminum Ratio of 2.5–5, say 3. The framework Silica to Alumina Ratio is calculated according to the following formula wherein UCS is the Unit Cell Size in Angstrom units:

$$SiO_2/Al_2O_3 = 2[(1.6704/(UCS-24.19)-1)]$$

Surface Silicon to Aluminum Ratio—The Surface Silicon to Aluminum (Si:Al) Ratio (as measured by X-ray photoelectron spectroscopy) of the charge zeolite which may be treated by the process of this invention may be 1–3, say 2. This is the ratio which prevails over a depth of 50 Å on the surface of the charge zeolite particles.

Zeolite Content—The charge zeolites which may be treated by the process of this invention may be of high zeolite content—typically 85%–100%, say 100% as measured by X-ray diffraction.

Acid Site Density—The Acid Site Density of the charge zeolites which may be treated by the process of this invention may be 7–32, say 28 cc $NH_3$ STP/g as measured by temperature programmed desorption (TPD) of ammonia. This is expressed in units of cc of $NH_3$ at STP conditions per gram of zeolite.

Acid Resistance—The acid resistance of the charge zeolites which may be treated by the process of this invention may typically be 0–30, say 10 (as measured by percent of zeolite crystallinity remaining after contact with a standard acid solution).

The charge zeolites may include ultrastable Y-zeolites and dealuminated Y-zeolites with Silica to Alumina Ratios of 5–10.

It is a feature of this process that it permits attainment of outstanding results when the charge zeolite is an ultrastable Y-type zeolite.

The charge zeolite may be in the hydrogen form, the ammonium form, or in an exchanged form, i.e. a form in which the alkali metal has been exchanged for one or more rare earth metals. The preferred form is an ammonium Y-zeolite.

Illustrative commercially available zeolites which may be treated by the process of this invention may include the following, the properties of which are set forth in the table which follows:

TABLE

Typical Charge Zeolites

A. The Valfor CP 300-56 brand of ultrastable Y-zeolite (USY) of PQ Corp.
B. The LZ-Y82 brand of Y-zeolite of Union Carbide (an ultra-stable Y-zeolite.)

TABLE

| Property | CHARGE ZEOLITE | |
|---|---|---|
| | A | B |
| Primary Pore Size Å | 23, 47 | 22 |
| Primary Pore Volume cc/gg | 0.08 | 0.08 |
| Unit Cell Size Å | 24.57 | 24.51 |
| Secondary Pore Size Å | none | none |
| Secondary Pore Volume cc/g | 0.02 | 0.02 |
| Total Pore Volume cc/g | 0.11 | 0.11 |
| Total Surface Area m²/g | 683 | 626 |
| Crystallinity % | 100 | 100 |
| Framework $SiO_2$ to $Al_2O_3$ Ratio | 6 | 8.4 |
| Acid Site Density cc $NH_3$/g | 28.9 | 26.2 |
| Surface Silicon to Aluminum Ratio | 2.0 | 1.5 |

The preferred charge zeolite is an ultrastable zeolite such as the Valfor CP300-56 USY brand of ultrastable Y-type zeolite of PQ corp.

It is a feature of the process of this invention that the charge, preferably an ultrastable Y-type zeolite, is contacted with steam at about 1000° F.–1200° F., say 1000° F. Preferably the steam employed should contain little or no other gases such as carbon dioxide, oxygen, nitrogen, etc. In the preferred embodiment, the steam will be substantially 100% steam, i.e. it contains less than about 10 wt % of non-steam components. It is found that presence of non-steam components in amount greater than about 10 wt % is undesirable because it slows down the reaction.

Although operation at temperature slightly below about 1000° F. (say down to about 800° F.) may be employed, it is found that the desired results are attained to a lesser degree. At temperature of about 600° F. or less, the desired changes may not be attained to any desired degree. Operation at temperature above about 1200° F. undesirably increases the cost of operation; and as the temperature rises above this level, there is increasing chance of forming ultrastable Y-zeolites with the undesirable unit cell size of greater than 24.2 Angstroms. Furthermore it does not appear that it is possible to consistently attain desired low lattice constant above about 1200° F.

The charge zeolite is maintained at the noted steaming temperature for 0.5–8 hours, preferably 1–5, say about 5 hours. Operation below the lower end of the range does not yield desired Lattice Constant of the final product zeolite; and operation above the upper end of the range normally yields zeolites having Lattice Constants greater than 24.19 Å. It is found that the desired degree of improvement (as measured for example by the decrease in the lattice constant) is typically obtained after about 3–5 hours.

At the conclusion of the desired contacting with steam for 0.5–5 hours at temperatures from 1000° F. to 1200° F. the treated zeolite is recovered and cooled to ambient temperature.

The characteristics of the steam treated zeolite may be as follows:

Primary Pore Size—The Primary Pore Size is typically 20 Å–100 Å, say about 47 Å. Thus it may be observed that there is no significant change in Primary Pore Size.

Primary Pore Volume—The Primary Pore Volume is typically 0.07–0.09, say about 0.08 cc/g. Thus it may be observed that there is no significant change in Primary Pore Volume.

Unit Cell Size—The Unit Cell Size (or Lattice Constant) of the treated zeolite is decreased typically to 24.28 Å–24.47 Å, say 24.32 Å–24.42 Å, say 24.39 Å.

Secondary Pore Size—The Secondary Pore Size of the treated zeolite is typically 100 Å–600 Å and commonly 105 Å–190 Å.

Secondary Pore Volume—The Secondary Pore Volume of the treated zeolite is 0.09–0.13, say 0.10 cc/g. It is unexpected that the Secondary Pore Volume should increase by 300%–650%, say 500% over the Secondary Pore Volume of the charge zeolite.

Total Pore Volume—The Total Pore Volume of the treated zeolite is 0.16–0.20 cc/g, say 0.18 cc/g which is unexpectedly 50%–90%, say 70% greater than the Total Pore Volume of the charge zeolite.

Total Surface Area—The Total Surface Area of the treated zeolite is 500–600 m²/g, say 573 m²/g.

Crystallinity—The crystallinity of the treated zeolite is 75%–95%, say 88%.

Framework Silica to Alumina Ratio—The Silica to Alumina Ratio of the treated zeolite is 10–36, say 16. This corresponds to a Silicon to Aluminum Ratio of 5–18, say 8.

Surface Silicon to Aluminum Ratio—The Surface Silicon to Aluminum Ratio is typically 1.0–1.5, say 1.3:1 which is only 60%–70% of that of the charge zeolite. The Surface Silicon to Aluminum Ratio is measured by X-ray photoelectron spectroscopy. Thus, an Al-enriched surface has been created.

Acid Site Density—This Al-enriched surface is characterized by having a low total number of acid sites. The Acid Site Density of the steam treated zeolite is thereby reduced to 5–16, say 10 cc $NH_3$/g.

Acid Resistance—The acid resistance of the treated zeolite is 45%–65%, say 50%.

It will thus be apparent that the treated zeolite is particularly characterized by (i) an increase in the number of pores in the range of about 100 Å–600 Å and the Secondary Pore Volume, (ii) a decrease in the Unit Cell Size (or Lattice Constant), (iii) a decrease in the crystallinity, and (iv) a decrease in the Surface Silicon to Aluminum Ratio. These treated zeolites are also characterized by (i) a Primary Pore Size and volume which is essentially comparable to that of the charge zeolite, (ii) a decrease in Total Surface Area, (iii) decreased Acid Site Density, and (iv) increased acid resistance.

It is a feature of the process of this invention that the hydrothermally treated Y-zeolite may be contacted in aqueous medium with an acid preferably having a $pK_a$ of less than about 5. It is found that it is possible to prepare product zeolite having a decreased Lattice Constant below about 24.19 Å only if the acid is used in concentration of greater than 0.2N. A lower concentration of acid, e.g., 0.1N or 0.2 N hydrochloric acid, when used, will not permit attainment of product zeolites having the desired low Lattice Constant of below about 24.19 Å.

The acids which may be employed may include water-soluble inorganic acids typified by the following; (the $pK_a$ set forth for polybasic acids is that corresponding to the first ionization step):

TABLE I

| Acid | $pK_a$ |
| --- | --- |
| Nitric | <-1 |
| Hydrochloric | <-1 |
| Sulfuric | <-1 |
| o-phosphoric | 2.12 |

Acid gases such as hydrogen chloride, etc., may be employed.

Typical water-soluble organic acids which may be employed may be typified by the following:

TABLE II

| Acid | $PK_a$ |
| --- | --- |
| Citric | 3.08 |
| Acetic | 4.75 |
| Oxalic | 1.23 |
| Propionic | 4.87 |

The preferred inorganic acids include strong mineral acids such as nitric acid or hydrochloric acid. The preferred organic acids include citric acid or dicarboxylic acid such as oxalic, succinic acid. The most preferred acid is nitric acid.

The acids may be employed in aqueous media in concentrations of >0.2N, typically >0.2N to 2.0N, say 0.5N. Treating of the hydrothermally treated zeolites may typically be effected by contacting 100 parts of hydrothermally treated zeolite with 1000–5000 parts, say 2500 parts of 0.5N to 2.0N aqueous acid at 140° F.–220° F. for 0.5–5 hours, say 2 hours.

At the end of the acidification operation, the zeolite particles may be separated from the aqueous acid medium and washed several times with water at ambient temperature. During each washing, the zeolite may contact the wash water for 0.2–2 hours, say 0.5 hours. Each washing may utilize 1000–5000 parts, say 2500 parts of water per 100 parts of zeolite.

The hydrothermally treated and acid treated zeolite may be characterized as follows:

Primary Pore Size—The Primary Pore Size is typically 20 Å–100 Å, say about 47 Å, Primary Pore Volume—The Primary Pore Volume is typically 0.09–0.12, say about 0.10 cc/g.

Unit Cell Size—The Unit Cell Size (or Lattice Constant) of the treated Y-zeolite is unexpectedly decreased to below about 24.19 Å and typically to 24.02 Å–24.18 Å, say 24.12 Å–24.15 Å. As reported in Developments in Zeolite Catalysts, Catalytic Studies No. 4887 Z, 1987, page 13, a Unit Cell Size of 24.19 Å is the lower theoretical limit for Y-type zeolites as determined by the Breck and Flanigan equation. The results indicate that the steam treated zeolite with the unit cell size between 24.28 Å–24.47 Å, more preferably 24.32 Å–24.42 Å, say 24.39 Å can be acid treated to give the product of the instant invention, a Y-zeolite having unit cell size of less than 24.19 Å.

Secondary Pore Size—The Secondary Pore Size of the treated zeolite is typically 100 Å–600 Å and commonly 105 Å–190 Å.

Secondary Pore Mode—The Secondary Pore Mode of the treated zeolite is typically 105 Å–190 Å, say 125 Å–135 Å.

Secondary Pore Volume—The Secondary Pore Volume of the treated zeolite is 0.11–0.14, say 0.13 cc/g. It is unexpected that the Secondary Pore Volume should increase by 350%–700%, say 650% over the Secondary Pore Volume of the charge zeolite.

Total Pore Volume—The Total Pore Volume of treated zeolite is 0.16–0.25 cc/g, say 0.23 cc/g which is unexpectedly 50%–150%, say 100% greater than the Total Pore Volume of the charge zeolite.

Total Surface Area—The Total Surface Area of the treated zeolite is 350–800 m$^2$/g, say 721 m$^2$g.

Framework Silica to Alumina Ratio—The Silica to Alumina Ratio of the treated zeolite is 60–80, say about 77. This corresponds to a Silicon to Aluminum Ratio of 30–40, say 38.5

Surface Silicon to Aluminum Ratio—The Surface Silicon to Aluminum Ratio is typically 24–36, say 30.

Crystallinity—The crystallinity of the treated zeolite is 40%–65%, say 45% of the charge zeolite. Hence the treated zeolite contains amorphous materials such as alumina, silica-alumina and silica up to 60%.

Acid Site Density—The Acid Site Density of the treated zeolite is 1–6, say 3 cc $NH_3$/g.

Acid Resistance—The acid resistance of the treated zeolite is 80%–100%, say 95%.

It is to be noted that the hydrothermally treated and acid treated zeolite is particularly characterized by:

(i) an unexpectedly large increase in the number of secondary pores as is evidenced by the increase in pore volume. It will be noted that the charge zeolite is characterized by a Secondary Pore Volume of only 0.02–0.05 cc/g and the hydrothermally treated zeolite is characterized by a Secondary Pore Volume of 0.09–0.13 cc/g—while the hydrothermally treated and acid treated zeolite is characterized by a Secondary Pore Volume of 0.11–0.14 cc/g.

(ii) A substantially decreased Lattice Constant. The charge typically has a Lattice Constant of 24.45 Å–24.60 Å, say 24.57 Å and the hydrothermally treated zeolite has a Lattice Constant of typically 24.28 Å–24.47 Å. The hydrothermally treated and acid treated zeolite has a lattice constant of 24.02 Å–24.18 Å, which is below the lowest value of 24.20 Å as reported in the Catalytica reference supra.

(iii) A substantial decrease in the Acid Site Density. The charge typically has an Acid Site Density of 5–16 cc $NH_3$/g and the hydrothermally treated zeolite has an Acid Site Density of 5–16 cc $NH_3$/g and the hydrothermally treated and acid treated zeolite has an Acid Site Density of 1–6 cc $NH_3$/g.

A catalyst support can be prepared by mulling a physical mixture of the hydrothermally treated and acid treated zeolite described above with the peptized pseudoboehmite and extruding 1/16" diameter pellets of this composition (80% zeolite/20% alumina) and calcining at 1000°–1300° F. This zeolite/alumina catalyst support may be loaded with, e.g., platinum-group noble metals such as platinum or palladium and utilized in hydrogenation processes, hydroisomerization processes, reforming processes, or wax conversion processes.

It is a feature of the zeolite product of this invention that it may be useful as a catalyst or catalyst component in hydrocarbon cracking as in a fluid catalytic cracking process wherein hydrocarbon charge, such as a gas oil, is cracked at 900° F.–1100° F., typically 960° F. at 0–20 psig, say 0 psig. It is found that the novel zeolite catalyst of this invention may be particularly effective in cracking the 900° F. ibp fraction of charge gas oils. The zeolite catalyst gives improved gasoline selectivity as compared to catalysts having a Unit Cell Size greater than 24.19 Å. As determined by the light cycle gas oil in the cracked product (i.e. % of the oil boiling between 430° F. and 650° F.), the zeolite catalyst of this invention desirably yields crackate having typically 5–10% less of the light cycle gas oil than prior art zeolites. Another important advantage of the zeolite catalyst of this invention is that it yields less than one-half the amount of coke produced by processes using prior art USY zeolites. This is believed to be due to the presence of an increased volume of Secondary Pores (which is typically 0.11–0.14 cc/g, as distinguished from prior art zeolites which are essentially free of Secondary Pores) and an increased Secondary Pore Mode (which is typically 105 Å–190 Å as distinguished from prior art zeolites which do not have a Secondary Pore Mode—because of the absence of Secondary Pores).

DESCRIPTION OF SPECIFIC EMBODIMENTS

Practice of the process of this invention will be apparent to those skilled in the art from inspection of the following wherein all parts are parts by weight unless otherwise stated. An asterisk indicates a control example.

EXAMPLE I

In this example, which represents the best mode presently known of carrying out the process of this invention, the charge zeolite is the Valfor CP-300-56 USY brand of ammonium ultrastable Y-type zeolite of PQ Corp. This Y-zeolite is characterized by the properties set forth in the table infra.

In this example, the charge zeolite (as crystals of particle size of 0.2–0.4 microns) is contacted with essentially 100% steam for 5 hours at 1000° F. This charge zeolite is characterized as in the following table. At the end of the treating period, the hydrothermally treated zeolite is characterized as in the following table. The hydrothermally treated zeolite is cooled to 140° F. and contacted with 0.5N aqueous nitric acid (4 parts of zeolite per 100 parts of aqueous nitric acid) at 140° F. for 2 hours. The aqueous liquid is then removed and the zeolite dried for 24 hours at 250° F.

TABLE III

| Property | Charge Zeolite | Steam Treated Zeolite | Steam Treated and Acid Treated Zeolite |
|---|---|---|---|
| Primary Pore Size Å | 23 | 47 | 47 |
| Primary Pore Volume cc/g | 0.09 | 0.08 | 0.10 |
| Unit Cell Size Å | 24.57 | 24.39 | 24.12 |
| Secondary Pore Volume cc/g | 0.02 | 0.10 | 0.13 |
| Secondary Pore Mode Å | — | 115 | 125 |
| Total Pore Volume cc/g | 0.11 | 0.18 | 0.23 |
| Total Surface Area m²/g | 683 | 573 | 721 |
| Crystallinity % | 100 | 88 | 50 |
| SiO$_2$:Al$_2$O$_3$ Ratio | 6 | 16 | 77 |
| Surface Si:Al Ratio | 2.0 | 1.3 | 30 |
| Zeolite Content | 100 | 82 | 45 |
| Acid Site Density cc NH$_3$ g | 28.9 | 10 | 3 |
| Acid Resistance | 0 | 50 | 95 |

A sample of fluid catalytic cracking (FCC) catalyst can be prepared by spray-drying of a physical mixture containing approximately 35% zeolite, in a silica/alumina/clay matrix which comprises 39% kaolin clay and 26% by weight of silica/alumina binder.

This catalyst may be employed in an FCC process to which is charged a high nitrogen-containing vacuum gas oil having the following properties set forth in Table IV.

TABLE IV

Typical Petroleum Feedstock
(Puget Sound Plant Vacuum Gas Oil)

| | |
|---|---|
| API Gravity | 27.6 |
| Sulfur, wt % | 1.32 |
| Total Nitrogen, wppm | 4480 |
| Kinematic Viscosity, cSt | 11.31 |
| @ 76.7° C. | |
| @100° C. | |
| Aniline Point, °F. | 6.17 |
| Bormine Number | |
| Aromatics, wt % | |
| Carbon Residue, wt % | 0.30 |
| n-C5 Insoluble, wt % | |
| n-C7 Insoluble, wt % | |
| Metals, wppm | |
| Ni | 1.9 |
| V | 2.9 |
| Fe | 1.3 |
| Cr | <0.5 |
| Na | 2.7 |
| Distillation, °F. (D2887 TBP wt % by GC) | |
| IBP | 486 |
| 5% | 597 |
| 10% | 633 |
| 20% | 677 |
| 30% | 713 |
| 40% | 746 |
| 50% | 780 |
| 60% | 814 |
| 80% | 896 |
| 90% | 957 |
| 95% | 1007 |
| EP | 1116 |

TABLE V

| Example | Zeolite Content | Unit Cell Size A | Total Pore Vol cc/g | Surface Si:Al Ratio | Sec. Pore Vol 100–600 A | Sec. Pore Mode A | Total Surface Area m²/g | Acid Site Density ccNH$_3$/g |
|---|---|---|---|---|---|---|---|---|
| II | 45 | 24.15 | 0.24 | — | 0.13 | 135 | 717 | — |
| III | 50 | 24.12 | 0.23 | 30 | 0.12 | 125 | 721 | — |
| IV | 59 | 24.18 | 0.23 | — | 0.12 | 125 | 782 | 5.1 |
| V | 64 | 24.17 | 0.24 | 30 | 0.14 | 135 | 720 | 2.4 |
| VI* | 63 | 24.18 | 0.24 | 26 | 0.14 | 125 | 739 | 2.4 |

TABLE V-continued

| Example | Zeolite Content | Unit Cell Size A | Total Pore Vol cc/g | Surface Si:Al Ratio | Sec. Pore Vol 100–600 A | Sec. Pore Mode A | Total Surface Area m²/g | Acid Site Density ccNH₃/g |
|---|---|---|---|---|---|---|---|---|
|  |  | (24.25)** |  |  |  |  |  |  |
|  |  | (24.27)** |  |  |  |  |  |  |
| VII | 54 | 24.12 | 0.20 | — | 0.11 | 155 | 705 | 2.1 |
| VIII | 43 | 24.05 | 0.22 | 38 | 0.12 | 145 | 688 | 2.0 |

**Numbers in parentheses are obtained from triplicate runs at identical conditions

EXAMPLES II–VIII

In this series of Examples, the same charge zeolite as that charged to Example I was subjected to steam treating and acid treating conditions. Various properties of the final product were determined as a function of the treating conditions.

Steam Treatment—Treating agent was 100% steam at 1000° F. in these Examples except that the steam temperature was 1400° F. in Example VI*. Treating time was 2 hours in Example II, 0.5 hours in Example VI*, and 5 hours in the remaining Examples.

Acid Treatment Conditions—All runs were carried out for 2 hours at 140° F. except Example II which used 220° F. Examples II, VI and VI used 0.5N aqueous nitric acid. Examples III, V, VII, and VIII used 2.0N aqueous nitric acid. All examples used a weight ratio of 0.04—ratio of solid to liquid during contacting.

Control Example VI* was run in triplicate. The first time, the lattice constant attained was 24.18 Å; the second time 24.25 Å; the third time 24.27 Å, the latter two being noted in parenthesis. This illustrates that although it may be possible to attain low lattice constant at 1400° F., the results are inconsistent. Consistent reproducible results are only attained by operating below about 1200° F.

From the Table V, it is apparent that:

(i) The Unit Cell Size of the product zeolite may be as low as 24.05 Å and may range from 24.05 Å to 24.18 Å. (Down from a charge zeolite at 24.56 Å).

(ii) Zeolite content of the product may range from 43% to 64%, the charge zeolite possessing a zeolite content of substantially 100%.

(iii) The Total Pore Volume of the product is about 0.22–0.24 cc/g compared to a charge pore volume of 0.11 cc/g.

(iv) The Pore Volume of the Secondary 100 Å–600 Å pores is about 0.11–0.14 cc/g compared to a charge Secondary Pore Volume of 0.3 cc/g.

(v) The Secondary Pore Mode of the treated product may be 125 Å–155 Å whereas the charge zeolite has no secondary pores.

(vi) The Total Surface Area of the treated product maybe 688–782 square meters per gram as compared to a charge area of 683 m²/g.

These results indicate that Y-zeolites with unit cell sizes less than 24.19 Å can be prepared by subjecting the charge zeolite to steam calcination and acid treatment at conditions specified in the instant invention. The aluminum ion-exchange step, as disclosed in U.S. Pat. Nos. 5,059,567 and 5,242,677, is a critical step in the preparation of stabilized Y-zeolites with unit cell sizes less than 24.19 Å. The instant invention represents an improvement in reducing the processing cost because the aluminum ion-exchange step is eliminated.

EXAMPLE IX*

In this Control Example IX*, the procedure of Example I is duplicated except that the acid employed is 0.1N hydrochloric acid. The product zeolite has a Unit Cell Size of 24.33 Å.

EXAMPLE X*

In this Control Example X*, the procedure of Example I is duplicated except that the acid employed is 0.2N hydrochloric acid. The product zeolite has a Unit Cell Size of about 24.35 Å.

EXAMPLE XI*

In this Control Example XI*, the procedure of Example I is duplicated except that the acid employed is 0.2N nitric acid. The product zeolite has a Unit Cell Size of about 24.36 Å.

EXAMPLE XII*

In this Control Example XIII, the procedure of Example I is duplicated except that the acid employed is 2N hydrochloric acid. The product zeolite has a Unit Cell Size of about 24.13 Å.

EXAMPLE XIII*

In this Control Example XIII*, the procedure of Example I is duplicated except that the acid employed is 0.2N sulfuric acid. The product zeolite has a Unit Cell Size of about 24.35 Å.

The above results show that the concentration of mineral acid employed in the acid treatment step must be greater than 0.2N in order to obtain a product with a Unit Cell Size less than 24.19 Å.

EXAMPLE XIV*

In this Control Example, an attempt was made to duplicate Experiment 5 of Example I of U.S. Pat. No. 3,506,400 to Eberly et al. This Example was selected because it produced a zeolite having the lowest Unit Cell Size (24.28 Å) of those set forth in Table VI of that patent.

In this run, the charge was steamed at 1200° F. for 16 hours (which is outside the scope of the instant invention) and then treated with 0.5N hydrochloric acid at 220° F. for 4 hours.

The product zeolite had a Unit Cell Size of 24.25 Å.

EXAMPLE XV*

In this control Example, the procedure of Example XIV* (the Eberly technique) was duplicated except that the acid treating was effected at 140° F. for 2 hours.

The product zeolite had a Unit Cell Size of 24.25 Å.

EXAMPLES XVI–XXb

In this series of Examples, the procedure of Example I was duplicated except that the concentration of the hydrochloric acid was varied.

TABLE VI

| Example | Normality of Hydrochloric Acid | Unit Cell Size Å |
|---|---|---|
| XVI* | 0.1 | 24.33 |
| XVII* | 0.2 | 24.34 |
| XVIII | 1.0 | 24.19 |
| XIX | 0.5 | 24.15 |
| XX | 2.0 | 24.13 |
| XXa | 0.5 | 24.14 |
| XXb | 0.5 | 24.16 |

The Unit Cell Size reported for Example XIX is 24.15 Å. This run was repeated twice—in Example XXa, the product had a Unit Cell Size of 24.14 Å. In Example XXb, the product had a Unit Cell Size of 24.16 Å.

EXAMPLES XXI–XXIV

In this series of Examples, the procedure of Example I was duplicated except that the conditions were as follows (the acid treatment was with hydrochloric acid).

TABLE VII

| Example | Stream Treating T° F. | Hours | Acid T° F. | N | Hours | Unit Cell Size Å |
|---|---|---|---|---|---|---|
| XXI | 1000 | 5 | 212 | 0.5 | 4 | 24.02 |
| XXII* | 1000 | 5 | 212 | 0.1 | 4 | 24.35 |
| XXIII* | 1000 | 5 | 212 | 0.1 | 4 | 24.34 |
| XXIV* | 1000 | 16 | 212 | 0.5 | 2 | 24.27 |

EXAMPLE XXV

In each of the following examples, the zeolite materials were evaluated for their gas oil cracking activities using the FCC-MAT unit. The FCC-MAT unit consists of a syringe pump for feed injection, a down-flow fixed-bed reactor, a cold trap, and a water displacement reservoir for the measurement of volume of gas product, and an on-line gas chromatograph for analyzing gas product composition. The typical operating conditions for the FCC-MAT unit are:

| | |
|---|---|
| Reaction temperature | 900–960° F. |
| Catalyst weight (including diluent) | 4 g |
| Feed injection time | 38 second |
| Weight hourly space velocity | 29–30 h$^{-1}$ |
| Catalyst to oil ratio | 3–7 |

In the FCC-MAT test, the zeolites are physically mixed with inert diluents such as sand or an equilibrium FCC catalyst prior to testing. The liquid products were analyzed for their boiling point distribution using simulated distillation by GC. The heavy cycle oil (HCO) or slurry oil was defined as gas oil fraction with boiling point greater than 670° F. Gasoline was the fraction boiled below 421° F. Products distilled between 421° F. and 670° F. Was assigned as light cycle oil (LCO). The conversion of FCC-MAT test was calculated as:

*wt % Conversion=100−wt % HCO yield−wt % LCO yield*

The coke yield was determined by using Leco carbon analyzer. The gasoline selectivity was defined as the ratio of gasoline yield to conversion.

In each of the following examples, 0.25 g of zeolite was blended with 3.75 g of Ottawa acid-washed sand prior to the FCC-MAT test. The feedstock used for these runs was Puget Sound Plant vacuum gas oil, the characteristics of which are shown in Table IV. The results of FCC-MAT tests at 960° F., WHSV of 29, and catalyst to oil weight ratio of 7 are set forth in Table VIII for four zeolite samples. The results in Tables VIII clearly illustrate that the zeolites of the present invention give improved gasoline selectivity and much reduced coke yield compared to the charge ultrastable Y-zeolite with the unit cell size of 24.56 Å, which is commonly employed in the commercial FCC catalysts. The results in Table IX also showed that a gas product having higher concentrations of propylene and butene can be achieved utilizing the zeolite of this invention as compared to the charge ultrastable Y-zeolite with the unit cell size of 24.56 Å.

EXAMPLE XXVI

Figure 1:
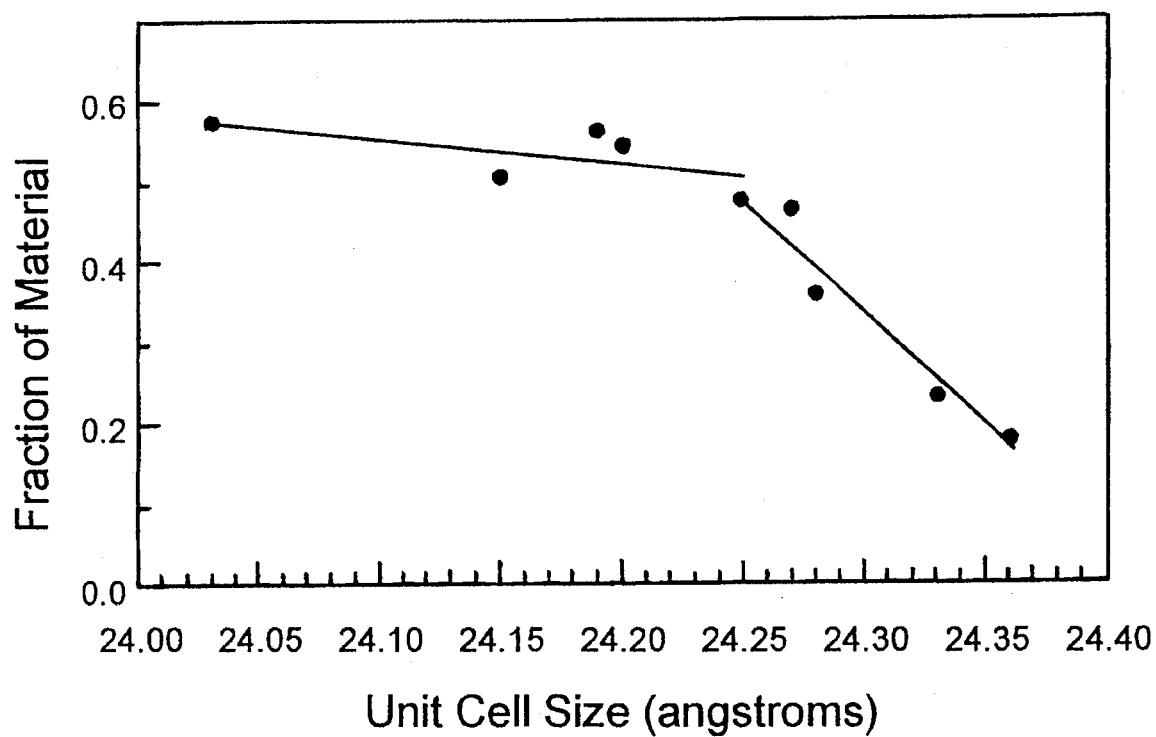
FIG. 1 demonstrates the fraction of material in the product which comprises $C_4$ olefins as the unit size of the zeolite catalyst decreases.
Figure 2:
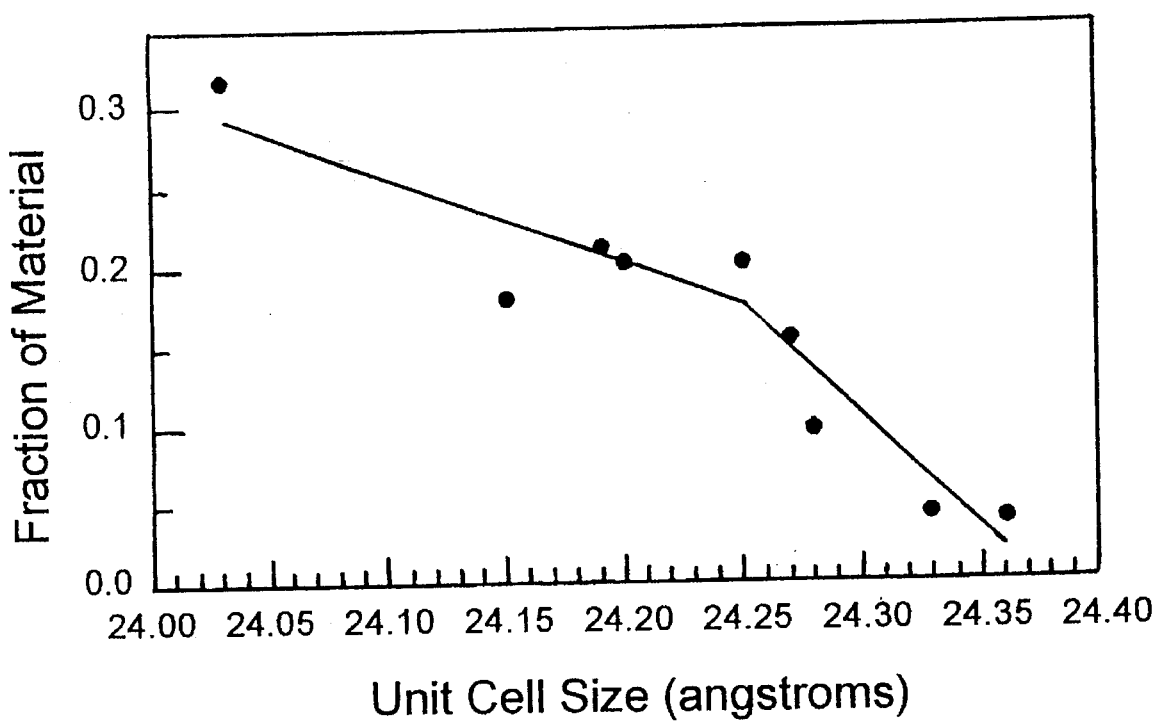
FIG. 2 shows the fraction of i-$C_4$ olefins as the unit cell size decreases.
Figure 3:
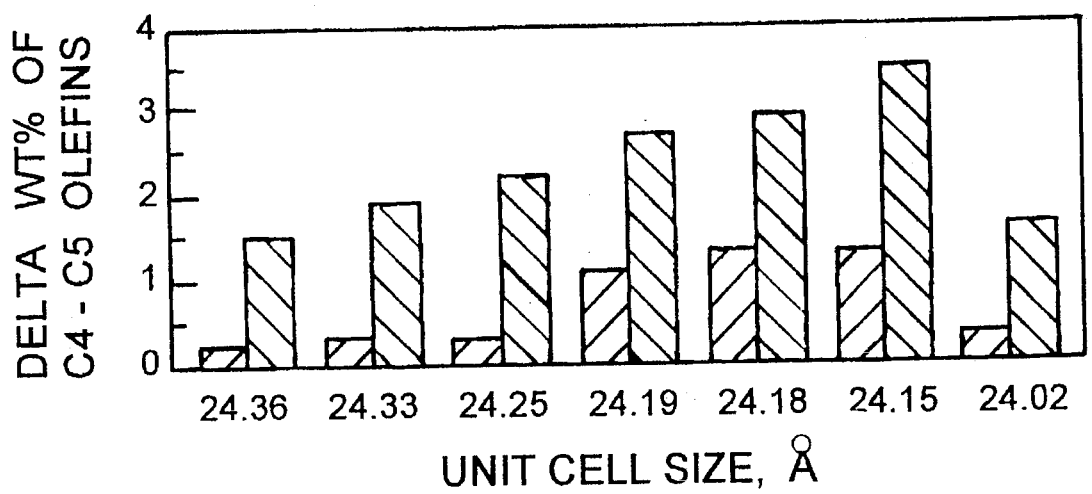
FIG. 3 graphically shows the effect of unit cell size on $C_4$ and $C_5$ olefin yield.

In each of the following examples, 0.25 g of zeolite was blended with 12.0 g of Ottawa acid-washed sand prior to the FCC-MAT test. The feedstock used for these runs was a full range naphtha obtained from hydroisomerization and hydrocracking of slack wax-20 feed. The properties of this naphtha feedstock are shown in Table X. The results of FCC-MAT tests at 960° F., WHSV of 32, and catalyst to oil weight ratio of 0.20 are set forth in Table XI for four zeolite samples. The results indicate that the Y-zeolites having low unit cell sizes of 24.02–24.19 Å give improved propylene, total butene, and isobutene compared to the Y-zeolite with unit cell size of 24.33 Å, which is also commonly employed in the commercial FCC catalysts. FIGS. 1 and 2 illustrate the respective dependencies of linear butenes and isobutene fractions on unit cell sizes of Y-zeolites. Both the linear butenes and isobutene fractions increase remarkably when the unit cell size is less than about 24.25 Å. FIG. 3 shows the yield of $C_5$ olefins in the liquid product as a function of unit cell size. The zeolite with the unit cell size of 24.15 Å outperformed the other Y-zeolites of prior arts which had with the unit cell sizes greater than 24.19 Å.

Although this invention has been illustrated by reference to specific embodiments, it will be apparent to those skilled in the art that various changes and modifications may be made which clearly fall within the scope of the invention.

TABLE X

| Typical Petroleum Feedstock (Full Range Naphtha) | |
|---|---|
| API Gravity | 60.5 |
| Sulfur, ppm | 4.2 |
| Total Nitrogen, ppm | 2.9 |
| Aromatics, wt % | 7.8 |
| Paraffins, wt % | 61.3 |
| Naphthenes, wt % | 30.9 |
| Olefins, wt % | 0.0 |
| Distillation, F (D2887 TBP wt % by GC) | |
| IBP | 86 |
| 5% | 144 |
| 10% | 168 |
| 20% | 199 |
| 30% | 218 |
| 40% | 242 |
| 50% | 249 |
| 60% | 266 |
| 80% | 306 |

TABLE X-continued

Typical Petroleum Feedstock (Full Range Naphtha)

| | |
|---|---|
| 90% | 338 |
| 95% | 363 |
| EP | 390 |

TABLE VIII

SUMMARY OF FCC-MAT TEST RESULTS FOR Y-ZEOLITES

| UCS Å | Conv. | Gasol. Yield | LCO Yield | HCO Yield | Coke Yield | Gasol. Selec. |
|---|---|---|---|---|---|---|
| 24.56 | 49 | 26 | 17 | 31 | 6 | 0.53 |
| 24.26 | 42 | 33 | 23 | 33 | 2 | 0.79 |
| 24.18 | 40 | 33 | 18 | 41 | 1 | 0.83 |
| 24.13 | 30 | 25 | 20 | 49 | 1 | 0.83 |

Conversion and all yields are reported as wt %.

TABLE IX

| Gas Product, wt % | 24.56Å | 24.26Å | 24.13Å |
|---|---|---|---|
| propylene | 0.12 | 0.18 | 0.19 |
| 1-butene | 0.027 | 0.038 | 0.029 |
| isobutene | 0.030 | 0.054 | 0.050 |
| trans-2-butene | 0.034 | 0.048 | 0.037 |
| cis-2-butene | 0.025 | 0.034 | 0.027 |
| Total butene | 0.116 | 0.174 | 0.143 |
| isobutane | 0.24 | 0.12 | 0.08 |
| isopentane | 0.044 | 0.060 | 0.045 |

TABLE XI

SELECTIVITY OF LIGHT OLEFINS PRODUCT

| UCS Å | Isobutane/ Total $C_4$ | Total Butene/ Total $C_4$ | Isobutene/ Total $C_4$ | Propylene/ Total $C_3$ |
|---|---|---|---|---|
| 24.33 | 0.605 | 0.231 | 0.044 | 0.764 |
| 24.25 | 0.461 | 0.474 | 0.202 | 0.894 |
| 24.19 | 0.384 | 0.558 | 0.211 | 0.890 |
| 24.15 | 0.424 | 0.505 | 0.180 | 0.858 |
| 24.03 | 0.368 | 0.574 | 0.316 | 0.908 |

What is claimed is:

1. A fluid catalytic cracking process for cracking hydrocarbon feedstock to selectively produce $C_3$–$C_5$ olefins comprising the steps of:

a) introducing the hydrocarbon feedstock into the reactor;

b) delivering simultaneously hot catalyst solids comprising a dealuminated Y-zeolite having a decreased unit cell size of less than about 24.19 Å to the cracking reactor, c) cracking catalytically and thermally the hydrocarbon feedstock with heat supplied by the hot catalyst solids to form a cracked product, d) separating the cracked product from the hot catalyst solids, and e) quenching the separated cracked product from the hot catalyst solids, wherein the total kinetic residence time of the hydrocarbon feedstock from step (a) to step (c) is from 0.1 to 15 sec., the temperature of the cracking reaction is from 840° F. to 1200° F., the pressure of the cracking reactor is from 0 to 150 psig, and the weight ratio of the catalyst solids to hydrocarbon feedstock is 1:10 to 10.1 and, wherein the dealuminated Y-zeolite is further characterized by (i) a Secondary Pore Size of 100 Å–600 Å, (ii) an increased Secondary Pore Volume of 0.11–0.14 cc/g. and (iii) a Secondary Pore Mode of 105 Å–190 Å.

2. The process of claim 1 wherein the hydrocarbon feedstock is selected from the group consisting of gas oil, naphtha and C6–C40 paraffins.

3. The process of claim 1 wherein the dealuminated Y-zeolite is further characterized by (i) a Surface Silicon to Aluminum Ratio of 26–36 and (ii) a Surface Silicon to Aluminum Ratio of 26–36 and (ii) an Acid Site Density of about 1–6 cc $NH_3$/g.

* * * * *